United States Patent
Lee et al.

(10) Patent No.: US 9,400,950 B2
(45) Date of Patent: Jul. 26, 2016

(54) INTEGRATED CIRCUIT CARD SOCKET HAVING A TERMINAL WITH A LOOP-SHAPED PORTION

(71) Applicant: Samsung Electronics Co., Ltd., Suwon-si, Gyeonggi-do (KR)

(72) Inventors: Jong-Joo Lee, Suwon-si (KR); Seok-Jae Han, Seongnam-si (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 14/808,111

(22) Filed: Jul. 24, 2015

(65) Prior Publication Data

US 2016/0036144 A1     Feb. 4, 2016

(30) Foreign Application Priority Data

Aug. 1, 2014     (KR) .................. 10-2014-0099236

(51) Int. Cl.
*H01R 24/00*     (2011.01)
*G06K 19/00*     (2006.01)
*H01R 12/50*     (2011.01)

(52) U.S. Cl.
CPC ............ *G06K 19/00* (2013.01); *H01R 23/7068* (2013.01)

(58) Field of Classification Search
CPC .............. H01R 12/70; H01R 12/7076; H01R 13/2442; H01R 23/7068; H01R 24/00; H01R 27/00
USPC ........................................ 439/629–632, 862
See application file for complete search history.

(56) References Cited

U.S. PATENT DOCUMENTS

| | | | |
|---|---|---|---|
| 5,891,591 A * | 4/1999 | Suzuki | H01M 2/20 429/178 |
| 6,102,730 A | 8/2000 | Kjeldahl et al. | |
| 6,116,956 A * | 9/2000 | Wu | H01R 13/2442 439/626 |
| 6,409,529 B1 * | 6/2002 | Liu | H01R 13/2442 439/188 |
| 6,527,590 B2 | 3/2003 | Oguchi | |
| 7,063,571 B2 * | 6/2006 | Yu | G06K 7/0021 439/630 |
| 7,455,531 B2 | 11/2008 | Hirabayashi et al. | |
| 7,585,188 B2 | 9/2009 | Regnier | |
| 2011/0136387 A1 | 6/2011 | Matsuura et al. | |
| 2012/0058657 A1 | 3/2012 | Hu | |
| 2012/0214344 A1 | 8/2012 | Cohen et al. | |
| 2012/0252276 A1 | 10/2012 | Zhu et al. | |

FOREIGN PATENT DOCUMENTS

| | | |
|---|---|---|
| KR | 100196221 | 2/1999 |
| KR | 1020040043252 | 5/2004 |
| KR | 1020110066848 | 6/2011 |

* cited by examiner

*Primary Examiner* — Chandrika Prasad
(74) *Attorney, Agent, or Firm* — Myers Bigel & Sibley, PA (57) ABSTRACT

An integrated circuit (IC) card socket includes a frame having a fixing portion and a connector. The connector includes a first portion fixed by the fixing portion, a second portion connected to one end of the first portion to contact a motherboard, and a third portion connected to another end of the first portion. The third portion has a shape of at least a portion of a loop, and a portion of the third portion contacts an IC card moving toward the third portion.

20 Claims, 10 Drawing Sheets

FIG. 1

1ST DIRECTION  2ND DIRECTION

1ST DIRECTION   2ND DIRECTION

INTEGRATED CIRCUIT CARD SOCKET HAVING A TERMINAL WITH A LOOP-SHAPED PORTION

CROSS-REFERENCE TO RELATED APPLICATION

This application claims priority under 35 USC §119 to Korean Patent Application No. 10-2014-0099236, filed on Aug. 1, 2014, the contents of which are incorporated herein by reference in their entirety.

BACKGROUND

A socket into which an integrated circuit (IC) card may be inserted into and through which the IC card may be connected to a motherboard includes a connector electrically connecting a pad of the IC card to the motherboard. As the IC card has a high speed and high performance, a plurality of pads are disposed in the IC card in plural columns, and the connectors connected to the plurality of pads may physically contact each other to generate an electrical short. A speed of transferring signals may decrease according to the length of each connector, and a cross-talk may be generated between the connectors.

SUMMARY

Example embodiments relate to an integrated circuit card socket. More particularly, example embodiments relate to a socket into which an integrated circuit card may be inserted and through which the integrated circuit card may be connected to a motherboard.

Example embodiments provide an IC card socket having good characteristics.

According to example embodiments, there is provided an IC card socket. The IC card socket includes a frame having a fixing portion and an opening adjacent the fixing portion, and a connector. A cover is on the frame and the cover and the frame define an open slot. The connector includes a first portion fixed by the fixing portion, a second portion extending from one end of the first portion into the opening and configured to contact a motherboard positioned below the frame, and a third portion extending from another end of the first portion toward the slot and then turning away from the slot. The third portion has a shape of at least a portion of a loop, and a portion of the third portion is configured to contact an IC card received in the slot and moving toward the third portion.

In example embodiments, the third portion of the connector may have a shape of a circular loop or an elliptical loop.

In example embodiments, the third portion of the connector may be formed by rotation through a central angle of more than about 270 degrees about a center of the circular loop or the elliptical loop measured from a direction that is orthogonal to a top surface of the fixing portion.

In example embodiments, as the IC card is received through the slot, the IC card may move toward a portion of the third portion of the connector that is formed by rotation through the central angle of about 0 degree to about 180 degrees about the center of the circular loop or the elliptical loop to contact the third portion of the connector.

In example embodiments, the third portion of the connector may have a ribbon-like shape formed by rotation through the central angle of more than about 360 degrees about the center of the circular loop or the elliptical loop.

In example embodiments, the portion of the third portion of the connector that is configured to contact the IC card may be an uppermost portion of the third portion of the connector.

In example embodiments, the fixing portion may extend in a first direction, and the IC card socket may include a plurality of connectors positioned in the first direction to form a connector row.

In example embodiments, the frame may include a plurality of fixing portions in a second direction substantially perpendicular to the first direction, and the IC card socket may include a plurality of connector rows to form a connector array.

In example embodiments, the fixing portion may include an insulating material.

According to example embodiments, there is provided an IC card socket. The IC card socket includes a frame having a fixing portion and an opening adjacent the fixing portion, and a connector. A cover is on the frame and the cover and the frame define an open slot. The connector includes a first portion fixed by the fixing portion, and a second portion extending from the first portion into the opening and toward the slot and then turning away from the slot. The second portion has a shape of at least a portion of a loop. A portion of the second portion is configured to electrically connect with a motherboard that is positioned below the frame, and another portion of the second portion is configured to contact an IC card received through the slot and moving toward the second portion.

In example embodiments, the second portion of the connector may be disposed horizontally parallel to the fixing portion, and a lowermost portion of the second portion may be lower than a bottom surface of the fixing portion and an uppermost portion of the second portion may be higher than a top surface of the fixing portion.

In example embodiments, the lowermost portion of the second portion of the connector may be configured to contact the motherboard, and the uppermost portion of the second portion of the connector may be configured to contact the IC card.

In example embodiments, the second portion of the connector may have a shape of a circular loop or an elliptical loop.

In example embodiments, the second portion of the connector may be formed by rotation through a central angle of more than about 270 degrees about a center of the circular loop or the elliptical loop.

In example embodiments, the second portion of the connector may have a ribbon-like shape formed by rotation through the central angle of more than about 360 degrees about the center of the circular loop or the elliptical loop.

In example embodiments, the first portion of the connector is surrounded by the fixing portion.

In example embodiments, the IC card socket may include a conductor fixed by the fixing portion and extending across the opening. The conductor may be configured to contact the motherboard. The second portion of the connector may contact an upper surface of the conductor. A bottom or bottom surface of the conductor may be lower than a bottom surface of the fixing portion.

According to example embodiments, there is provided an IC card socket. The IC card socket includes a frame having a fixing portion, and a connector. The connector includes a conductor fixed by the fixing portion and contacting a motherboard, and a connector contacting an upper surface of the conductor and having a shape of at least a portion of a loop. A portion of the connector contacts an IC card moving toward the connector.

In example embodiments, a portion of the connector may be fixed by the fixing portion.

In example embodiments, a bottom of the conductor may be lower than a bottom of the fixing portion.

In example embodiments, the connector may have a shape of a circular loop or an elliptical loop, and may be formed by rotation through a central angle of more than about 270 degrees about a center of the circular loop or the elliptical loop.

In example embodiments, the connector may have a ribbon-like shape formed by rotation through the central angle of more than about 360 degrees about the center of the circular loop or the elliptical loop.

According to example embodiments, there is provided an IC card socket. The IC card socket includes a frame having a fixing portion and an opening adjacent the fixing portion, a cover on the frame, with the cover and the frame defining an open slot, and a connector. The connector includes a first portion held by the fixing portion, a second portion that extends from a first end of the first portion into the opening and configured to contact a motherboard positioned below the frame, and an arcuate third portion that extends from a second, opposite end of the first portion toward the slot and then turns away from the slot. A portion of the third portion configured to contact an IC card received through the slot In example embodiments, the third portion of the connector may have a shape of at least a portion of a loop.

In example embodiments, at least a major portion of the third portion of the connector may be positioned above the fixing member.

In example embodiments, the third portion of the connector may include an uppermost portion that is configured to contact the IC card.

In example embodiments, the first portion of the connector may be embedded in the fixing portion.

According to example embodiments, the IC card socket may include the connector having the loop shape or the pig tail shape, and thus the connector may have the elastic force in the vertical direction, and may contact the IC card more strongly and stably. As the connector may have the loop shape or the pig tail shape, the connector may not be long horizontally, and thus the cross-talk or noise between the connectors may decrease, and an area of the connector may decrease.

BRIEF DESCRIPTION OF THE DRAWINGS

Example embodiments will be more clearly understood from the following detailed description taken in conjunction with the accompanying drawings. FIGS. 1 to 11 represent non-limiting, example embodiments as described herein.

DESCRIPTION OF EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of elements, components, sections, layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
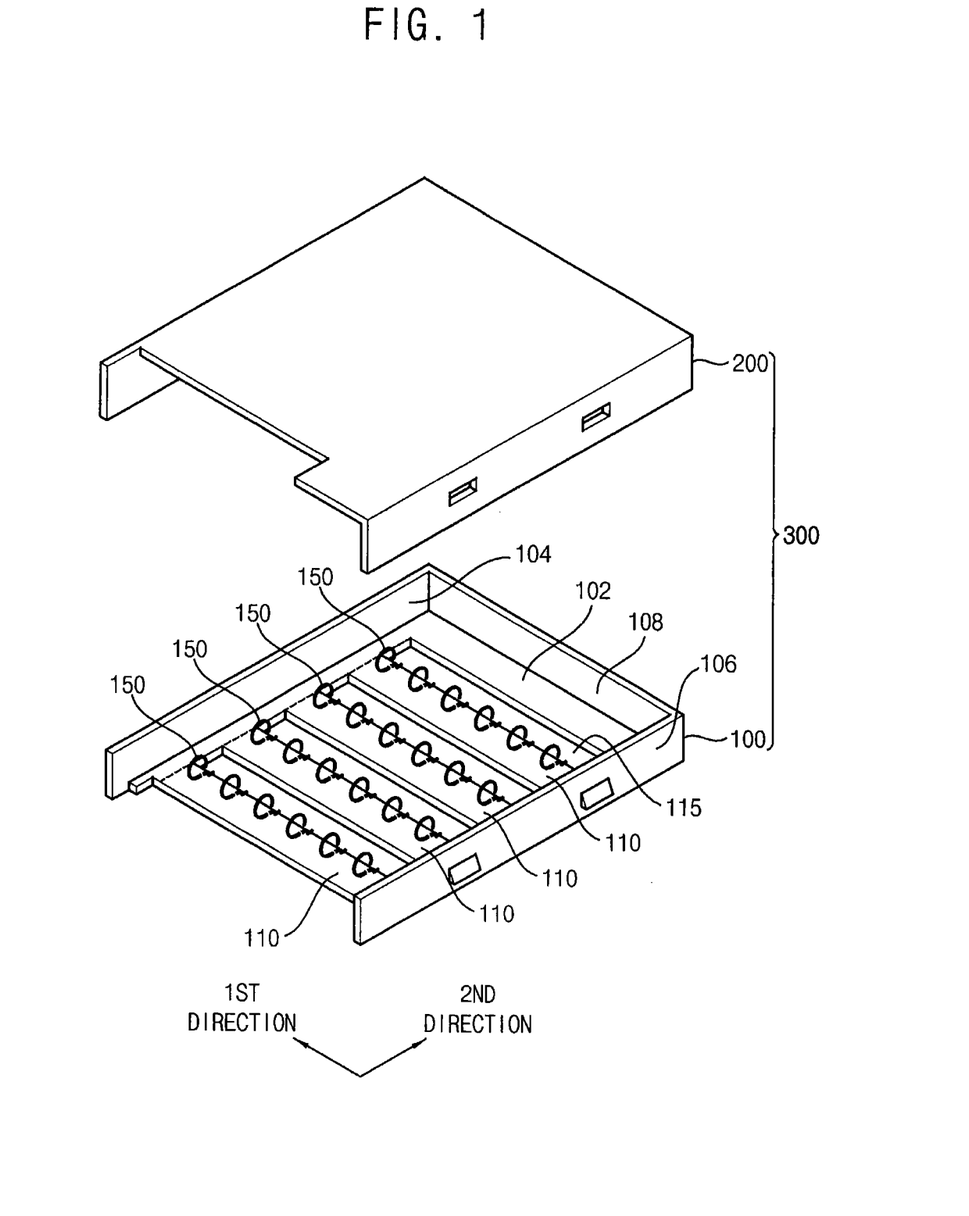
FIG. 1 is an exploded perspective view illustrating an integrated circuit (IC) card socket in accordance with example embodiments.
Figure 2:
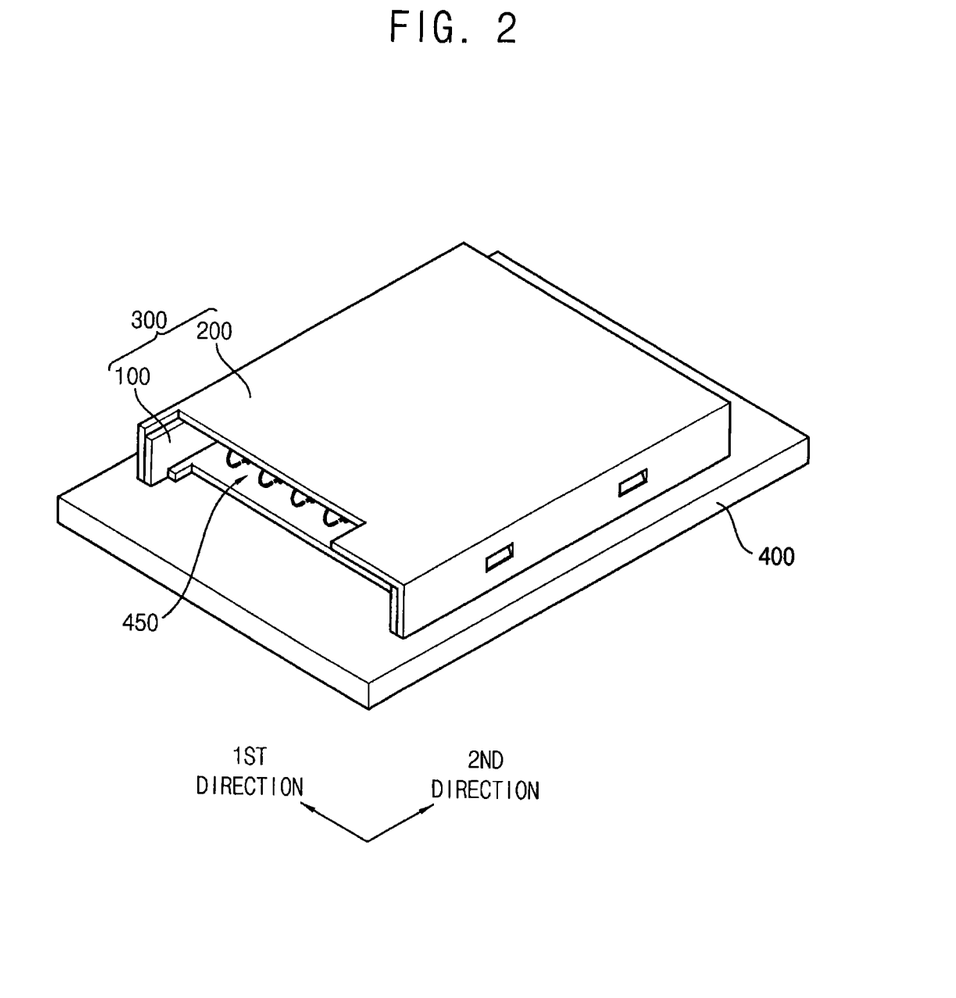
FIG. 2 is a perspective view illustrating the IC card socket of FIG. 1 coupled to a motherboard.
Figure 3:
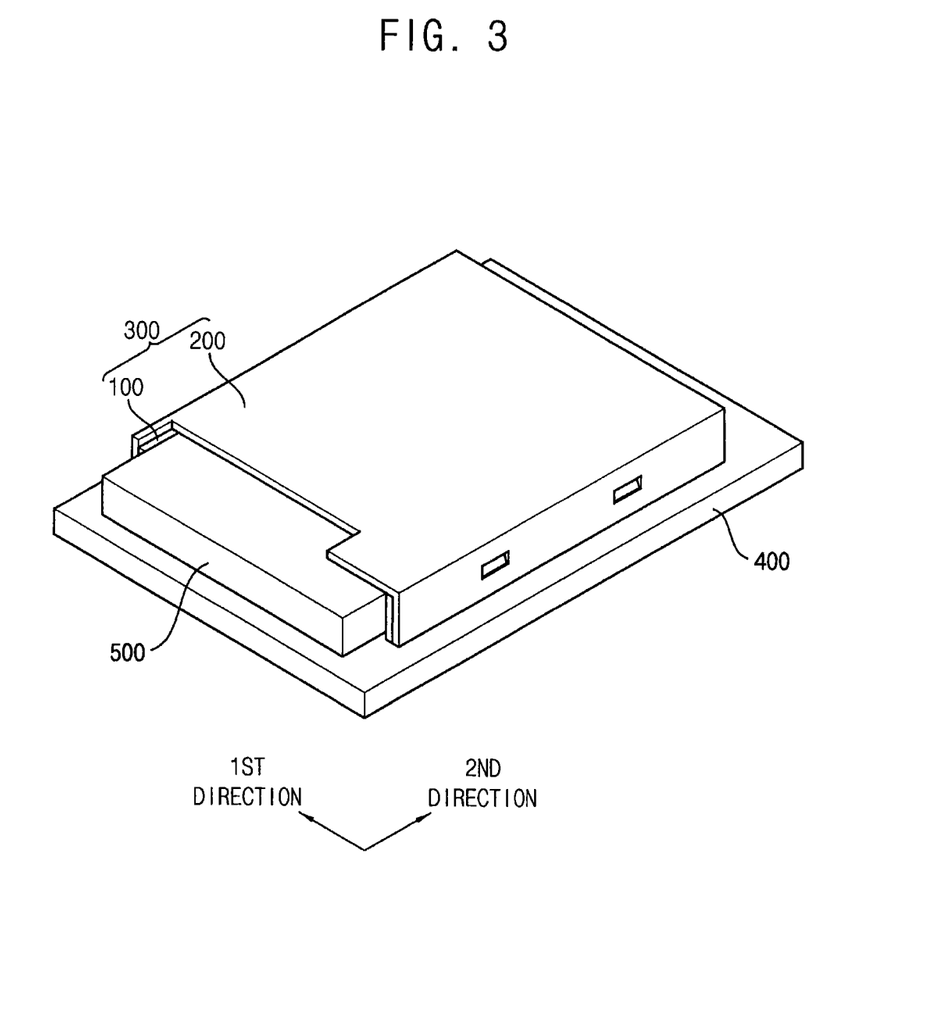
FIG. 3 is a perspective view illustrating an IC card inserted into the IC card socket and electrically connected to the motherboard of FIG. 2.
Figure 4:
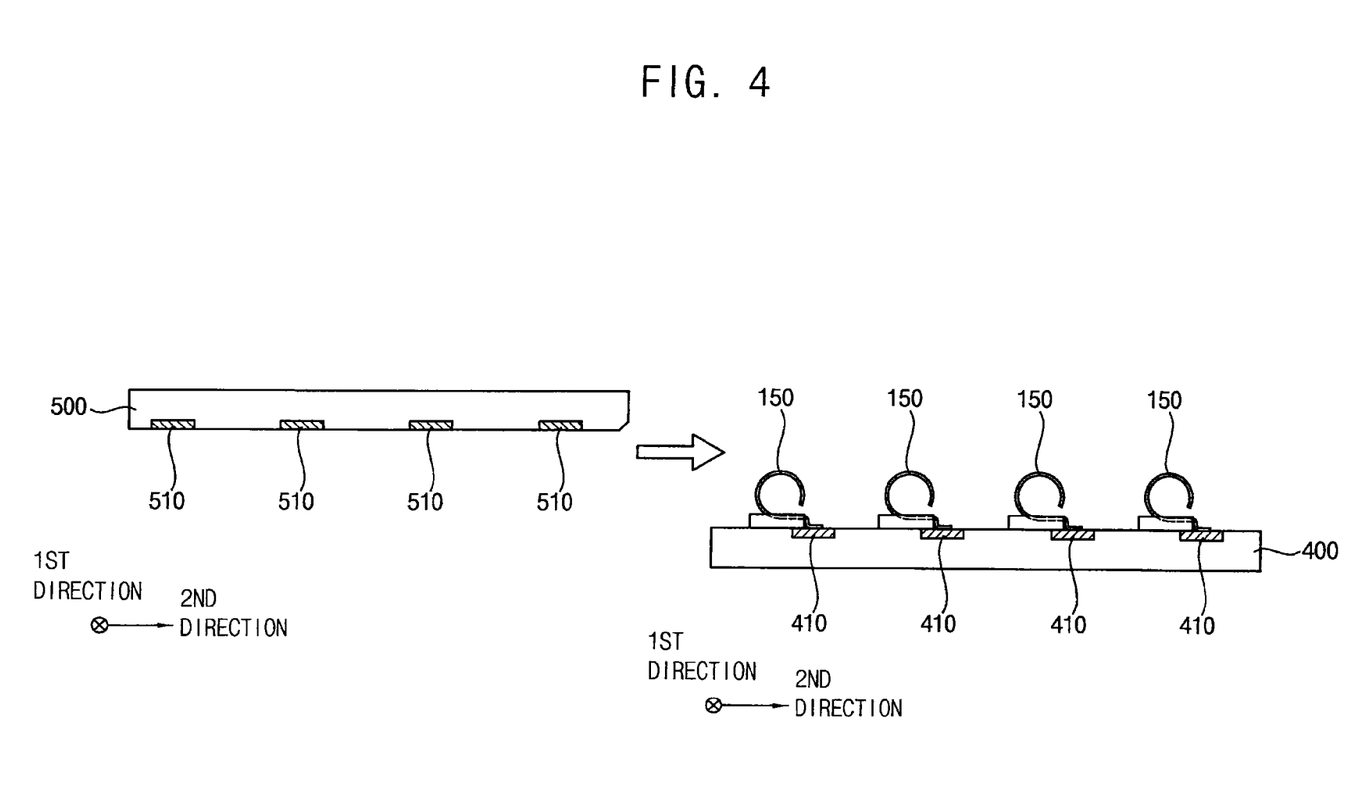
FIGS. 4 and 5 are side views illustrating a direction in which the IC card may be inserted into the IC card socket of FIG. 1.
Figure 5:
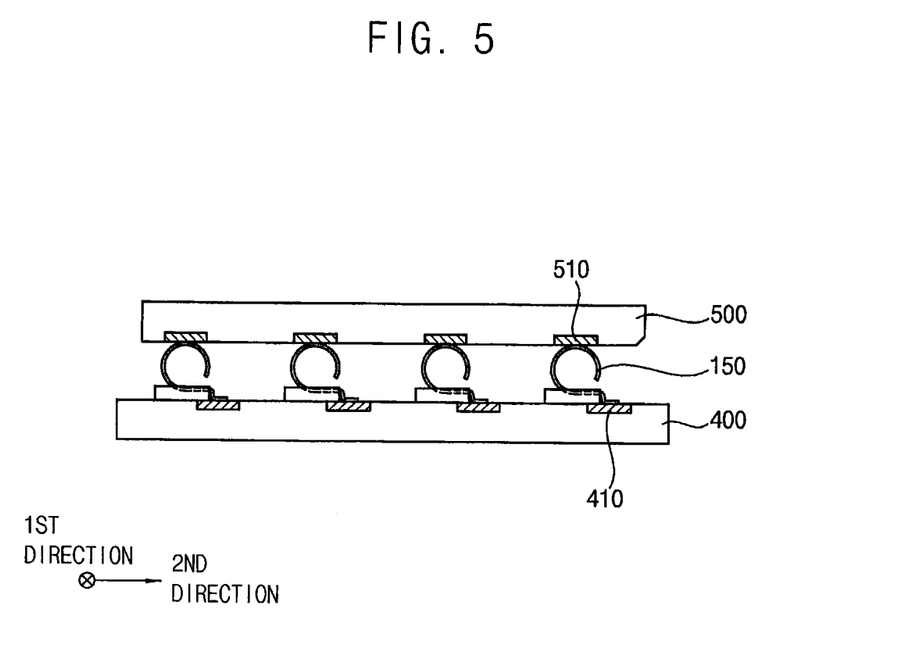
Figure 6:
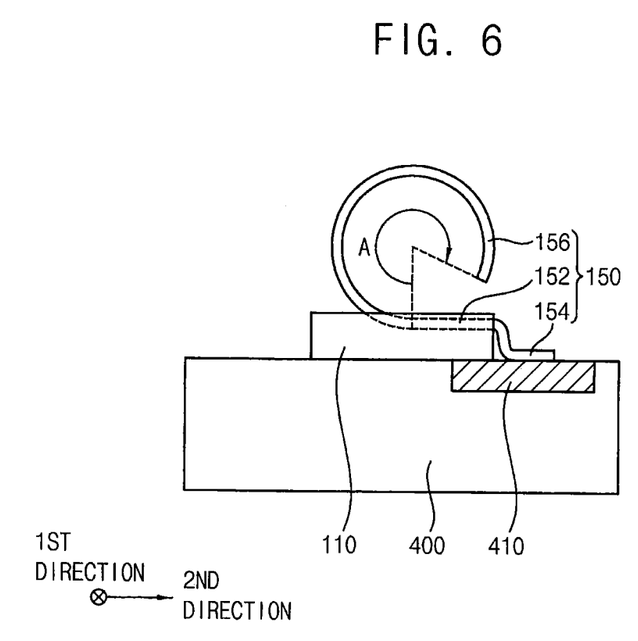
FIGS. 6 and 7 are cross-sectional views illustrating a location relationship between a fixing portion and a connector of the IC card socket and the motherboard of FIG. 2.
Figure 7:
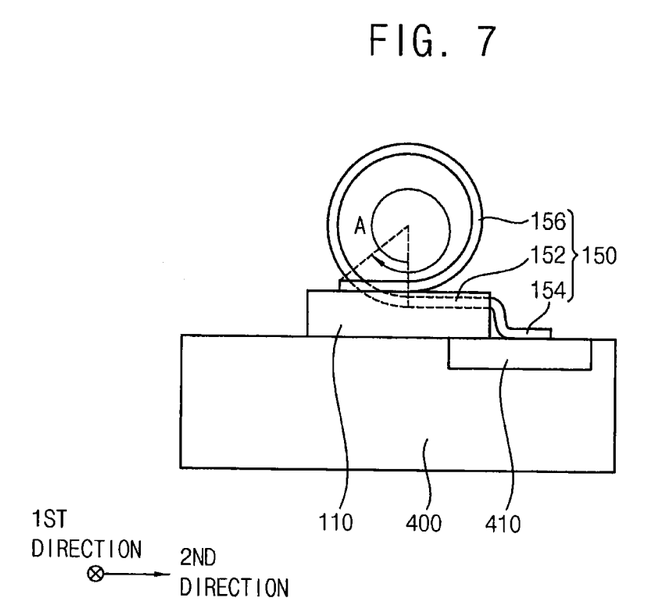

FIG. 1 is an exploded perspective view illustrating an integrated circuit (IC) card socket in accordance with example embodiments, FIG. 2 is a perspective view illustrating the IC card socket coupled to a motherboard, and FIG. 3 is a perspective view illustrating the IC card inserted into the IC card socket and electrically connected to the motherboard. FIGS. 4 and 5 are side views illustrating a direction in which the IC card may be inserted into the IC card socket. Additionally, FIGS. 6 and 7 are cross-sectional views illustrating a location relationship between a fixing portion and a connector of the IC card socket and the motherboard. For the convenience of explanation, other portions of the IC card socket except for the fixing portion and the connector are not shown in FIGS. 6 and 7.

Referring to FIGS. 1 to 7, an IC card 500 may be inserted into an IC card socket 300 to be electrically connected to a motherboard 400. The IC card socket 300 may include a frame 100, a cover 200 and a connector 150. The frame 100 and the cover 200 may be collectively referred to as a housing. The IC card 500 may be, e.g., a memory card.

The frame 100 may include a bottom or bottom wall 102 having a rectangular shape, and first, second and third sidewalls 104, 106 and 108 protruding from three sides of the rectangular bottom 102 to a given height.

In example embodiments, the first and second sidewalls 104 and 106 may face each other in a first direction substantially parallel to a top surface of the bottom 102, and may extend in a second direction substantially parallel to the top surface of the bottom 102 and substantially perpendicular to the first direction. The third sidewall 108 may extend in the first direction. Top surfaces of the first, second and third sidewalls 104, 106 and 108 may be substantially coplanar with each other.

An opening or channel 115 extending in the first direction may be defined in or formed through the bottom 102, and a portion of the bottom 102 adjacent to the opening 115 in the second direction may serve as a fixing portion or fixing member 110 for fixing the connector 150 to the frame 100. In example embodiments, a plurality of openings 115 may be formed in the second direction, and thus a plurality of fixing portions 110 may be formed in the second direction.

The first, second and third sidewalls 104, 106 and 108 may protrude upward from the bottom 102 including the fixing portion 110, and thus a space for mounting the connector 150 may be formed on the fixing portion 110. The fixing portion 110 may include an insulating material, e.g., plastic.

The connector 150 may include first, second and third portions 152, 154 and 156. The connector 150 may include a metal, e.g., aluminum, copper, etc.

The first portion 152 may be fixed to the frame 100 by the fixing portion 110. That is, the first portion 152 may be embedded in or surrounded by the fixing portion 110 to be fixed to the frame 100.

The second portion 154 may be connected to or extend from one end of the first portion 152 (e.g., a first end of the first portion 152) to be electrically connected to the motherboard 400. Particularly, the second portion 154 may extend from the first portion 152 in the second direction into or through the opening 115 to contact a conductive pad 410 on the motherboard 400, so as to be electrically connected to the motherboard 400. The motherboard 400 may be, e.g., a printed circuit board (PCB).

The third portion 156 may be connected to or extend from another end of the first portion 152 (e.g., a second end of the first portion 152 that is opposite the first end of the first portion 152) to have a loop shape or a pig tail shape over the fixing portion 110. That is, the third portion 156 may have a shape of at least a portion of a loop from side view. Put another way, the third portion 156 may extend away from the first portion 152 such that it first extends toward a slot 450 of the IC card socket 300 (FIG. 2) and then turns or loops away from the slot 450.

In example embodiments, the third portion 156 may be arcuate or have a shape of at least a portion of a circular loop or an elliptical loop. In an example embodiment, the third portion 156 may have a shape of a portion of a loop that may be formed by rotation through a central angle A of more than about 270 degrees about a center of the circular loop or the elliptical loop (refer to FIG. 6), e.g., measured from a direction that is orthogonal to a top surface of the fixing portion 110. In this way, the third portion 156 may have a free end that is not attached or connected to any other component or structure. The free end may point downward toward the fixing portion 110. In another example embodiment, the third portion 156 may have a ribbon-like shape that may be formed by rotation through the central angle A of more than about 360 degrees about the center of the circular loop or the elliptical loop (refer to FIG. 7), e.g., measured from a direction that is orthogonal to a top surface of the fixing portion 110. In this way, the third portion 156 may overlap itself adjacent the fixing portion 110.

In example embodiments, a plurality of connectors 150 may be formed in the first direction along or around one fixing portion 110 to form a connector row. As the plurality of fixing portions 110 may be formed in the second direction, a plurality of connector rows may be formed in the second direction, which may form a connector array including a plurality of connectors 150 disposed both in the first and second directions.

The IC card 500 may be inserted into an opening, slot or space 450 defined or formed between the frame 100 and the cover 200 of the IC card socket 300 when they are attached, connected or otherwise combined, and thus a signal pad 510 of the IC card 500 may contact the connector 150 to be electrically connected thereto. That is, the slot 450 may be defined in the housing that is formed by the combined frame 100 and cover 200. In example embodiments, a plurality of signal pads 510 may be formed both in the first and second directions to form a signal pad array (e.g., that corresponds to the connector array of the IC card socket 300).

In example embodiments, the IC card 500 may be received in the slot 450 and move toward a portion of the third portion 156 of the connector 150 that may be formed by rotation through the central angle A of about 0 degree to about 180 degrees to contact the connector 150. Particularly, the signal pad 510 of the IC card 500 may contact an uppermost portion of the third portion 156. As the IC card 500 moves in the second direction, even though the connector 150 may not have a complete loop shape that may be formed by rotation through the central angle A of 360 degrees, the IC card 500 may contact the connector 150 well with no damage to the signal pad 510 or the third portion 156 of the connector 150.

As the connector 150 may have the loop shape or the pig tail shape, the connector 150 may have an elastic force in the vertical direction, and thus the IC card 500 and the connector 150 may contact each other more strongly and stably. For example, the IC card 500 may compress the connector 150 downward to some degree, and the connector 150 may be biased to return to its original, uncompressed state. As the connector 150 may have the loop shape or the pig tail shape, the connector 150 may not be long in the horizontal direction (e.g., in the second direction), and thus the cross-talk or noise between the connectors 150 may decrease and an area of the connector 150 may decrease.

Figure 8:
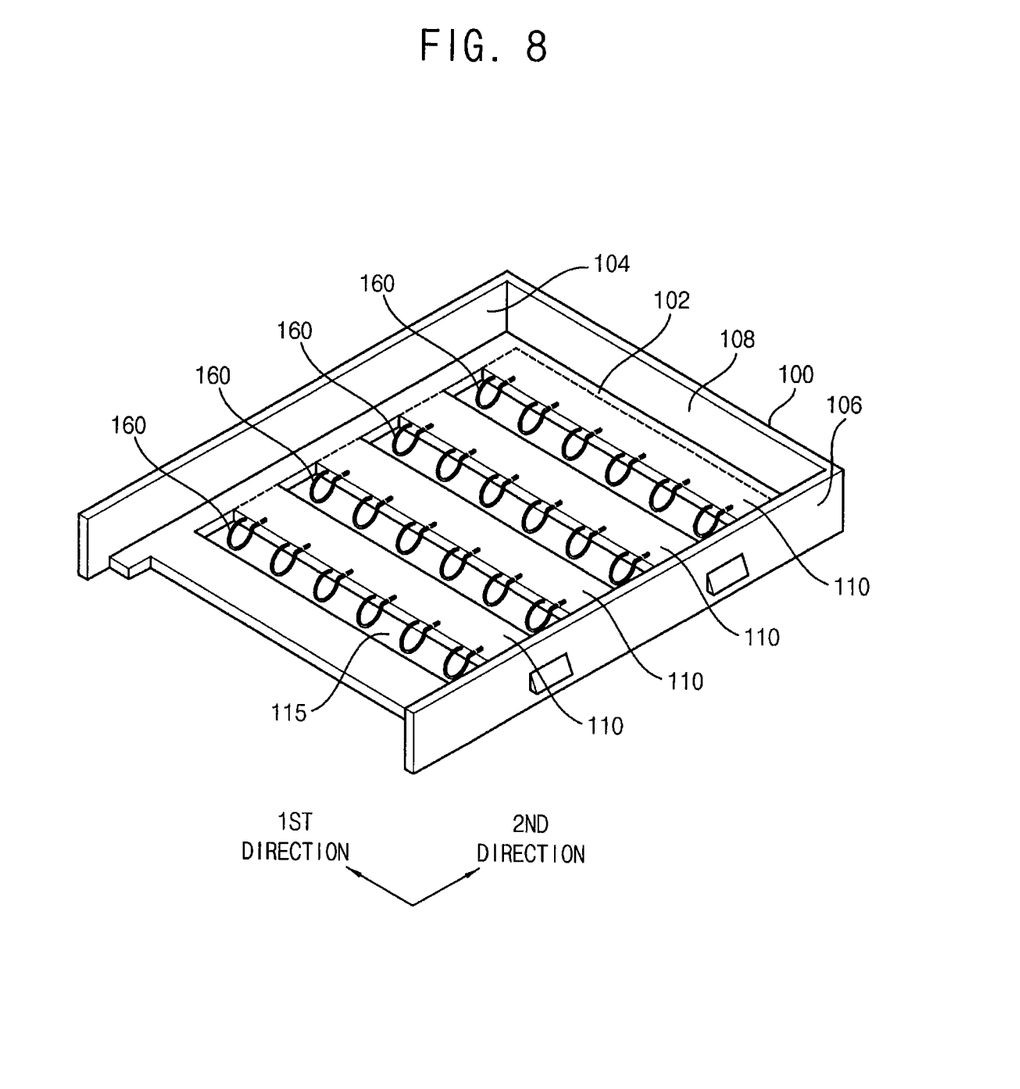
FIG. 8 is a perspective view illustrating an IC card socket in accordance with example embodiments.
Figure 9:
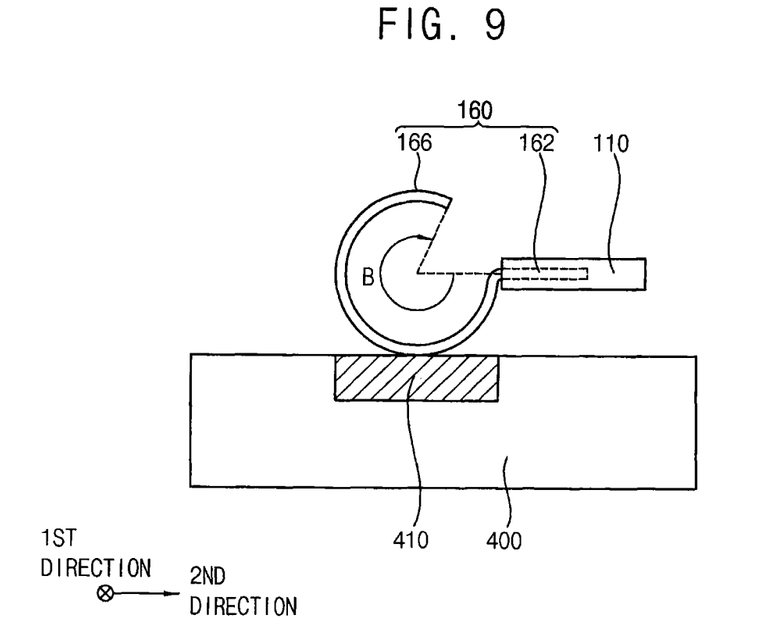
FIGS. 9 and 10 are cross-sectional views illustrating a location relationship between a fixing portion and a connector of the IC card socket of FIG. 8 and a motherboard.
Figure 10:
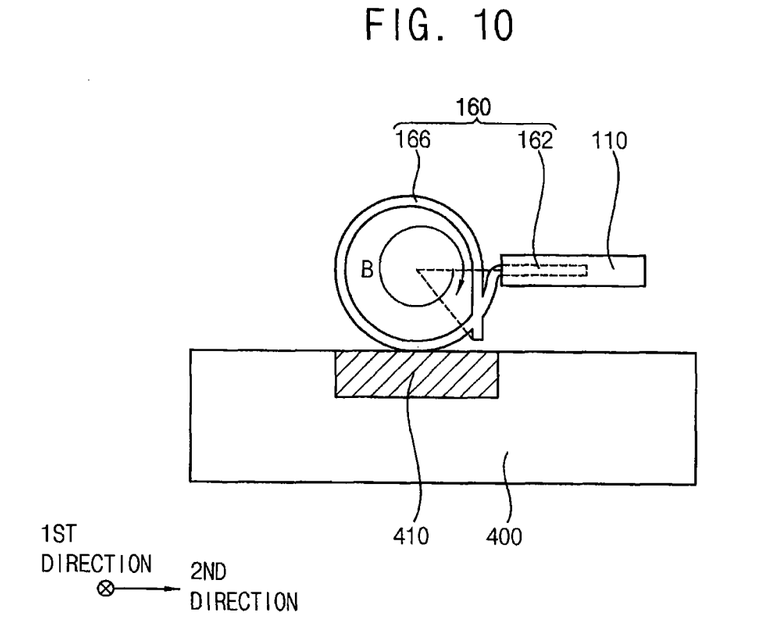

FIG. 8 is a perspective view illustrating an IC card socket in accordance with , example embodiments, and FIGS. 9 and 10 are cross-sectional views illustrating a location relationship between a fixing portion and a connector of the IC card socket and a motherboard. For the convenience of explanation, a cover of the IC card socket is not shown in FIG. 8, and other portions of the IC card socket except for the fixing portion and the connector are not shown in FIGS. 9 and 10. The IC card socket in FIGS. 8 to 10 may be substantially the same as or similar to that illustrated with reference to FIGS. 1 to 7 except for the shape and location of the connector. Thus, like reference numerals refer to like elements, and detailed descriptions thereon may be omitted below in the interest of brevity.

Referring to FIGS. 8 to 10, a frame 100 of an IC card socket 300 may include a bottom or bottom wall 102 having a rectangular shape, and first, second and third sidewalls 104, 106 and 108 protruding from three sides of the rectangular bottom 102 to a given height.

An opening 115 extending in the first direction may be defined in or formed through the bottom 102, and a portion of the bottom 102 adjacent to the opening 115 in the second direction may serve as a fixing portion 110 for fixing a connector 160 to the frame 100. In example embodiments, a plurality of openings 115 may be formed in the second direction, and thus a plurality of fixing portions 110 may be formed in the second direction.

A connector 160 may include first and second portions 162 and 166.

The first portion 162 may be fixed to the frame 100 by the fixing portion 110. That is, the first portion 162 may be embedded in or surrounded by the fixing portion 110 to be fixed to the frame 100.

The second portion 166 may be connected to or extend from the first portion 162 to have a loop shape or a pig tail shape, and a portion of the second portion 166 may contact the motherboard 400 and another portion of the second portion 166 may contact an IC card 500 (refer to FIG. 5).

Particularly, the second portion 166 may extend in the second direction to have a loop shape from the first portion 162 surrounded by the fixing portion 110 so that the second second portion 166 may be disposed horizontally parallel to the fixing portion 110. The second portion 166 may extend into the opening 115 adjacent the fixing portion 110 (FIG. 8). A lowermost portion of the second portion 166 may extend below or be lower than a bottom or bottom surface of the fixing portion 110, and an uppermost portion of the second portion 166 may extend above or be higher than a top or top surface of the fixing portion 110. Accordingly, the lowermost portion of the second portion 166 may contact a conductive pad 410 of a motherboard 400 through the opening 115 to be electrically connected to the motherboard 400, and an uppermost portion of the second portion 166, may contact a signal pad 510 of the IC card 500 through the opening 115 to be electrically connected to the IC card 500. Put another way, the lowermost portion of the second portion 166 may extend through the opening 115 and electrically connect to the conductive pad 410 of the motherboard 400, and the uppermost portion of the second portion 166 may extend through the opening 115 and electrically connect to the signal pad 510 of the IC card 500.

In example embodiments, the second portion 166 may have a shape of at least a portion of a circular loop or an elliptical loop. In an example embodiment, the second portion 166 may be arcuate or have a shape of a portion of a loop that may be formed by rotation through a central angle B of more than about 270 degrees about a center of the circular loop or the elliptical loop (refer to FIG. 9). The second portion 166 may have a free end that is not attached or connected to any other component or structure and may generally point toward the fixing portion 110. In another example embodiment, the second portion 166 may have a ribbon-like shape that may be formed by rotation through the central angle B of more than about 360 degrees about a center of the circular loop or the elliptical loop (refer to FIG. 10). In this way, the second portion 166 may overlap itself adjacent the fixing portion 110 or the first portion 162.

As the connector 160 may have the loop shape or the pig tail shape, the connector 160 may have an elastic force in the vertical direction, and thus the IC card 500 and the connector 160 may contact each other more strongly and stably in the manner described above in reference to the connector 150. As the connector 160 may have the loop shape or the pig tail shape, the connector 160 may not be long in the horizontal direction, and thus the cross-talk or noise between the connectors 160 may decrease and an area of the connector 160 may decrease.

Figure 11:
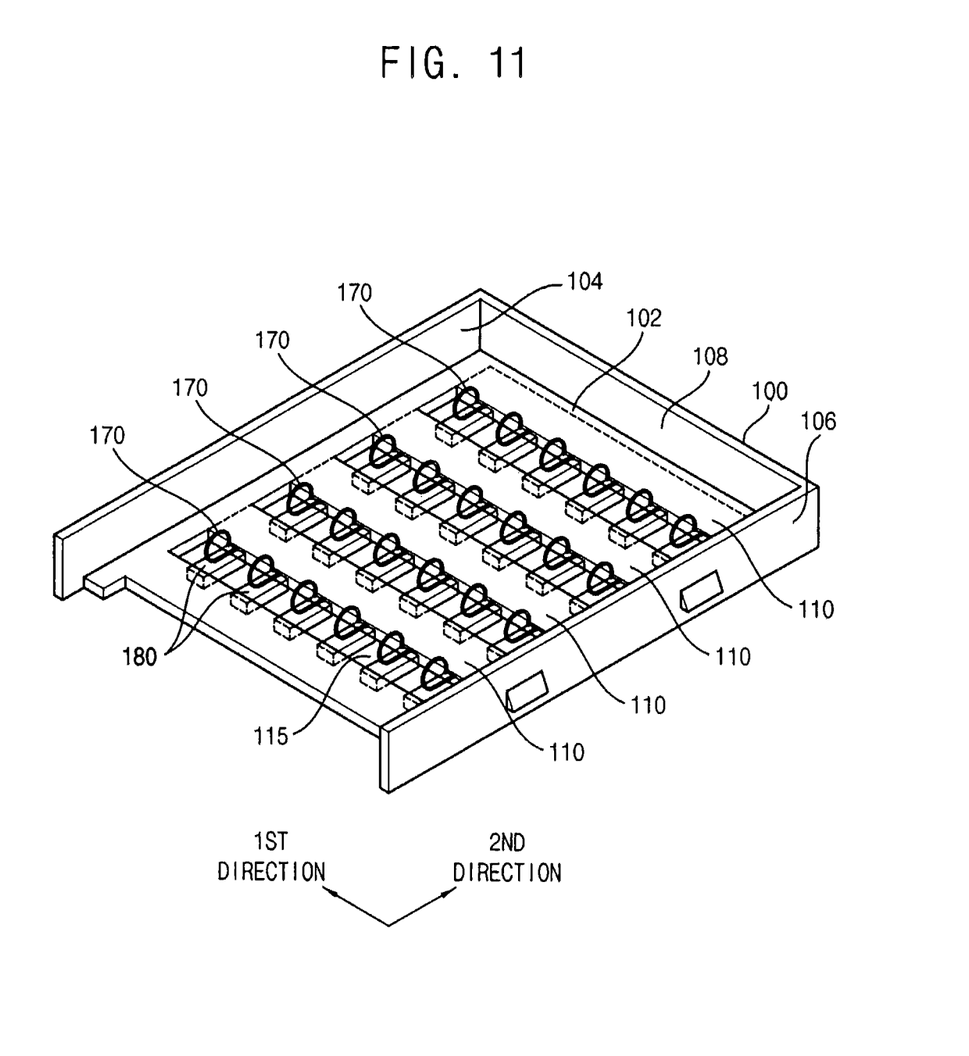
FIG. 11 is a perspective view illustrating an IC card socket in accordance with example embodiments.
Figure 12:
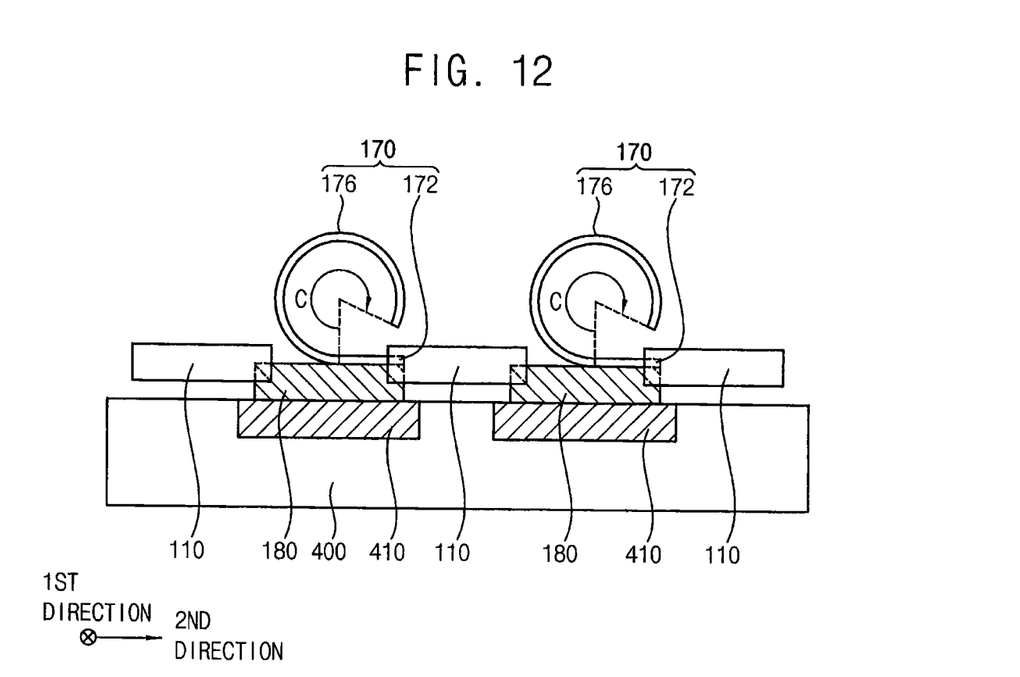
FIGS. 12 and 13 are cross-sectional views illustrating a location relationship between a fixing portion and a connector of the IC card socket of FIG. 11 and a motherboard.
Figure 13:
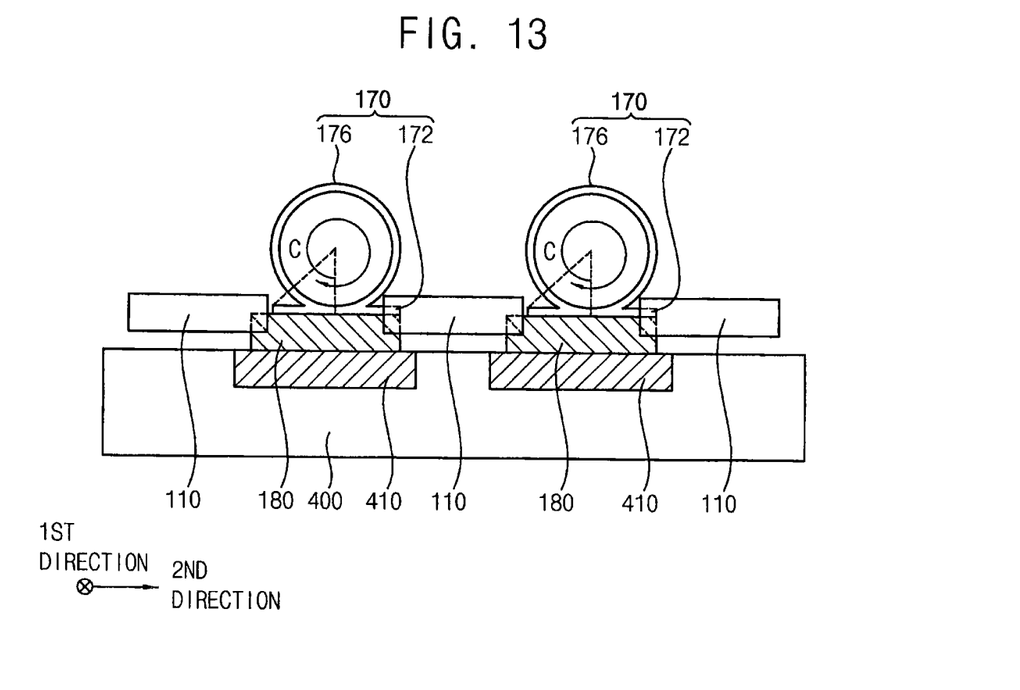

FIG. 11 is a perspective view illustrating, an IC card socket in accordance with example embodiments, and FIGS. 12 and 13 are cross-sectional views illustrating a location relationship between a fixing portion and a connector of the IC card socket and a motherboard. For the convenience of explanation, a cover of the IC card socket is not shown in FIG. 11, and other portions of the IC card socket except for the fixing portion, the connector and a conductor are not shown in FIGS. 12 and 13. The IC card socket in FIGS. 11 to 13 may be substantially the same as or similar to that illustrated with reference to FIGS. 1 to 7 except for the shape and location of the connector. Thus, like reference numerals refer to like elements, and detailed descriptions thereon may be omitted below in the interest of brevity.

Referring to FIGS. 11 to 13, a frame 100 of an IC card socket 300 may include a bottom or bottom wall 102 having a rectangular shape, and first, second and third sidewalls 104, 106 and 108 protruding from three sides of the rectangular bottom 102 to a given height.

An opening 115 extending in the first direction may be defined in or formed through the bottom 102, and a portion of the bottom 102 adjacent to the opening 115 in the second direction may serve as a fixing portion 110 for fixing a conductor 180 to the frame 100. In example embodiments, a plurality of openings 115 may be formed in the second direction, and thus a plurality of fixing portions 110 may be formed in the second direction.

The conductor 180 may be fixed by the fixing portion 110, and a bottom or bottom surface of the conductor 180 may be lower than that of the fixing portion 110. Particularly, both upper ends or upper end portions of the conductor 180 may be embedded in or surrounded by the fixing portion 110 to be fixed thereto, and a central upper surface of the conductor 180 may be exposed by the opening 115. The conductor 180 may include a metal, e.g., aluminum, copper, tungsten, etc. The bottom of the conductor 180 may contact a conductive pad 410 of a motherboard 400 to be electrically connected thereto.

In example embodiments, a plurality of conductors 180 may be formed in the first direction along or around one opening 115 to form a conductor row. As the plurality of openings 115 may be formed in the second direction, a plurality of conductor rows may be formed in the second direction, which may form a conductor array including a plurality of conductors 180 disposed both in the first and second directions.

A connector 170 may include first and second portions 172 and 176.

The first portion 172 may be embedded in or surrounded by the fixing portion 110 to be fixed to the frame 100. Alternatively, the connector 170 may not include the first portion 172. That is, the connector 170 may not be fixed by the fixing portion 110.

The second portion 176 may be connected to or extend from the first portion 172 to contact the upper surface of the conductor 180 and be fixed thereto. The second portion 176 may have a loop shape or a pig tail shape, and a portion of the second portion 176 may contact an IC card 500 (refer to FIG. 5).

Particularly, the second portion 176 may extend to have a loop shape over the conductor 180. Thus, a lowermost portion of the second portion 176 may be flat and may contact the upper surface of the conductor 180 to be electrically connected to the conductive pad 410 of a motherboard 400, and an uppermost portion of the second portion 176 may contact a signal pad 510 of the IC card 500 to be electrically connected to the IC card 500.

In example embodiments, the second portion 176 may have a shape of at least a portion of a circular loop or an elliptical loop. In an example embodiment, the second portion 176 may be arcuate and have a shape of a portion of a loop that may be formed by rotation through a central angle C of more than about 270 degrees about a center of the circular loop or the elliptical loop (refer to FIG. 12). The second portion 176 may have a free end that is not attached or connected to any other component or structure and that may point toward the fixing portion 110. In another example embodiment, the second portion 176 may have a ribbon-like shape that may be formed by rotation through the central angle C of more than about 360 degrees about a center of the circular loop or the elliptical loop (refer to FIG. 13). In this way, the second portion 176 may overlap itself adjacent the conductor 180.

As the connector 170 may have the loop shape or the pig tail shape, the connector 170 may have an elastic force in the vertical direction, and thus the IC card 500 and the connector 170 may contact each other more strongly and stably in the manner described above in reference to the connector 150. As the connector 170 may have the loop shape or the pig tail shape, the connector 170 may not be long in the horizontal direction, and thus the cross-talk or noise between the connectors 170 may decrease and an area of the connector 170 may decrease. As the IC card socket 300 may include the conductor 180, the connector 170 may be easily electrically connected to the motherboard 400.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims.

What is claimed is:

1. An integrated circuit (IC) card socket comprising:
   a frame having a fixing portion and an opening adjacent the fixing portion;
   a cover on the frame, the cover and the frame defining an open slot; and
   a connector including:
      a first portion fixed by the fixing portion;
      a second portion extending from one end of the first portion into the opening and configured to contact a motherboard positioned below the frame; and
      a third portion extending from another end of the first portion toward the slot and then turning away from the slot, the third portion having a shape of at least a portion of a loop, and a portion of the third portion configured to contact an IC card received through the slot and moving toward the third portion.

2. The IC card socket of claim 1, wherein the third portion of the connector has a shape of a circular loop or an elliptical loop.

3. The IC card socket of claim 2, wherein the third portion of the connector comprises a free end and is formed by rotation through a central angle of more than about 270 degrees about a center of the circular loop or the elliptical loop measured from a direction that is orthogonal to a top surface of the fixing portion.

4. The IC card socket of claim 3, wherein, as the IC card is received through the slot, the IC card moves toward a portion of the third portion of the connector that is formed by rotation through the central angle of about 0 degree to about 180 degrees about the center of the circular loop or the elliptical loop to contact the third portion of the connector.

5. The IC card socket of claim 3, wherein the third portion of the connector has a ribbon-like shape formed by rotation through the central angle of more than about 360 degrees about the center of the circular loop or the elliptical loop.

6. The IC card socket of claim 1, wherein the portion of the third portion of the connector that is configured to contact the IC card is an uppermost portion of the third portion of the connector.

7. The IC card socket of claim 1, wherein the fixing portion extends in a first direction, and the IC card socket includes a plurality of connectors positioned in the first direction to form a connector row.

8. The IC card socket of claim 7, wherein the frame includes a plurality of fixing portions in a second direction substantially perpendicular to the first direction, and the IC card socket includes a plurality of connector rows to form a connector array.

9. An IC card socket comprising:
   a frame having a fixing portion and an opening adjacent the fixing portion;
   a cover on the frame, the cover and the frame defining an open slot; and
   a connector including:
      a first portion fixed by the fixing portion; and
      a second portion extending from the first portion into the opening and toward the slot and then turning away from the slot, the second portion having a shape of at least a portion of a loop, a portion of the second portion configured to electrically connect with a motherboard positioned below the frame, and another portion of the second portion configured to contact an IC card received through the slot and moving toward the second portion.

10. The IC card socket of claim 9, wherein the second portion of the connector is disposed horizontally parallel to the fixing portion, and a lowermost portion of the second portion is lower than a bottom surface of the fixing portion and an uppermost portion of the second portion is higher than a top surface of the fixing portion.

11. The IC card socket of claim 10, wherein the lowermost portion of the second portion of the connector is configured to contact the motherboard, and the uppermost portion of the second portion of the connector is configured to contact the IC card.

12. The IC card socket of claim 9, wherein the second portion of the connector has a shape of a circular loop or an elliptical loop.

13. The IC card socket of claim 9, further comprising a conductor fixed by the fixing portion and extending across the opening, the conductor configured to contact the motherboard, the second portion of the connector contacting an upper surface of the conductor.

14. The IC card socket of claim 13, wherein a bottom of the conductor is lower than a bottom surface of the fixing portion.

15. The IC card socket of claim 9, wherein the first portion of the connector is surrounded by the fixing portion.

16. An IC card socket comprising:
   a frame having a fixing portion and an opening adjacent the fixing portion;
   a cover on the frame, the cover and the frame defining an open slot; and
   a connector including:
      a first portion held by the fixing portion;
      a second portion that extends from a first end of the first portion into the opening and configured to contact a motherboard positioned below the frame; and
      an arcuate third portion that extends from a second, opposite end of the first portion toward the slot and then turns away from the slot, a portion of the third portion configured to contact an IC card received through the slot.

17. The IC card socket of claim 16, wherein the third portion of the connector has a shape of at least a portion of a loop.

18. The IC card socket of claim 16, wherein at least a major portion of the third portion of the connector is positioned above the fixing member.

19. The IC card socket of claim 18, wherein the third portion of the connector comprises an uppermost portion that is configured to contact the IC card.

20. The IC card socket of claim 16, wherein the first portion of the connector is embedded in the fixing portion.

\* \* \* \* \*